Patented Feb. 1, 1949

2,460,787

UNITED STATES PATENT OFFICE 2,460,787

FELT BASE MATERIAL FOR ADHESIVE ATTACHMENT TO SURFACES AND COATING COMPOSITION FOR SAME

Ralph F. Seedorf, Cincinnati, Ohio, assignor to Carthage Mills, Inc., Cincinnati, Ohio, a corporation of Ohio No Drawing. Application April 30, 1945, Serial No. 591,218

9 Claims. (Cl. 117—90)

My invention relates to the provision of felt base materials to be joined to supporting surfaces by adhesive. By "felt base materials," I mean surfacing, wall covering and floor covering goods, usually with a decorative facing, but made on a base of felt or other fibrous material saturated with bitumen such as asphalt. The specific nature of the decorative face, if provided, is not a limitation on this invention. Common decorative facings are those consisting of paints, frequently applied in a plurality of layers and in attractive, multicolored designs. Other surfacings, such as printed fibrous layers, linoleum compositions and the like are employable; and for some uses my materials may be given a decorative facing after they have been applied to the supporting surfaces.

The adhesive application of felt base goods to supporting surfaces has hitherto involved some serious problems. The felt base itself, being saturated with asphalt, will not bond with any but the so-called waterproof cements, usually resinous binders dissolved in organic solvents, and do not always bond satisfactorily even with such cements. Specifically, water glues have not served to bind ordinary felt base materials to supporting surfaces.

The art has attacked the problem in various ways, as by providing on the reverse side of felt base goods a layer of the base itself which is unsaturated or only partially saturated and is therefore porous, so as to form a better bond with the adhesives. Again, in the manufacture of felt base materials, a layer of unsaturated fibrous material has been cemented in the factory to the reverse side of the felt base. Attempts have been made to coat the felt base at the factory with adhesive substances satisfactorily bonded thereto in the process of manufacture, but capable of being reactivated by water or organic solvents to adhere the felt base material to the supporting surface.

All of these expedients have their disadvantages, whether of operability, expense, or convenience; and there has not hitherto been produced any felt base product capable of being adhered to a supporting surface through the use of an adhesive applied on the job, and capable of being so adhered with both water type glues and waterproof cements, excepting products having porous, fibrous backings or layers. One of the objects of my invention is to produce a product having a non-porous felt base of ordinary type, but so prepared and treated as to be capable of adhesive union with surfaces by means of glues or cements of either type.

In cementing felt base materials to floors, walls, sink tops, articles of furniture and the like, great difficulty has hitherto been had in making a firm bond. The applied materials develop blisters, usually within the first forty-eight hours after application; and there is no real cure for such a condition after it has developed. The development of blisters usually arises from a parting of the felt base from the adhesive, in spite of all of the precautions which may be taken. It is an object of my invention to provide a felt base product so treated as to give a firmer bond with any of the available adhesives.

It is an object of my invention to provide a felt base product having its rear face coated with a layer of material which is not only firmly bonded to the felt base itself and to the bitumen therein, but forms a strong bond with glues or cements having either organic or inorganic vehicles.

These and other objects of my invention, which will be set forth hereinafter or will be apparent to one skilled in the art upon reading these specifications, I accomplish by that procedure, through the use of those compositions, and in those products of which I shall now describe exemplary embodiments.

Briefly, in the practice of my invention, I attain its object through the imposition on the rear face of felt base material of a composition which, under the conditions of its application, attacks, amalgamates with and penetrates to some extent both the felt and the bituminous saturant therein, forming a strong bond therewith. The composition itself in a dried condition is strong and tough and not liable to rupture from the stresses and traffic which the applied material will encounter. The coating, however, is attackable by the adhesives to be used in attaching the felt base material to the desired supporting surface, and to this extent is permeable by them and in effect porous to them. This action occurs irrespective of the nature of the binder material in the applied cements, i. e. whether it be soluble in or miscible with water or whether it be of waterproof character and soluble in or miscible with organic solvents only.

In other words, my compound is such as to show no repellency toward either water or organic solvents, to be permeable by them, and to show an affinity for adhesive binders whether of the water miscible or waterproof types. At the same time it forms a strong bond with the felt base.

In forming my composition, I use a binder which may be referred to as having both water soluble and oil soluble components, while at the same time it has great inherent strength. The binder may be made up of discrete components, one attackable by organic solvents and miscible with bitumen, and another attackable by water and miscible with the binders of water glues, the components being blended together in the composition. It is desirable that both components have good binding strength. Partially saponified materials such as alkaline soaps of rosin and/or tall oil and/or other acidic resinous materials capable of being saponified, combine the desired characteristics and are the binders I prefer to use. Most available and cheapest are the alkaline soaps of rosin, known commercially as "rosin size." The size may be purchased as such, or the saponification may be carried on in the process of producing my compositions.

The saponification of rosin is not a reaction which goes to completion in the mass. On the contrary, an equilibrium is attained wherein a certain quantity of the rosin soap exists in admixture with free rosin and free alkali. The specific quantities of these substances depend to some extent upon the relative quantities of rosin and alkali initially brought together; but I have found that the quantity of free rosin in commercial rosin size is suitable for my purpose. By way of example, I have successfully employed a commercial sodium resinate, 19% of which is found to be soluble in naphtha upon extraction. This naphtha soluble portion is the free rosin content of the rosin size.

The presence of free rosin in my composition provides a material not only compatible and miscible with bitumen, such as asphalt, but also compatible and miscible with the binder ingredients of waterproof cements. On the other hand, the sodium resinate in rosin size is attackable by water and has affinity for the binders in water type glues.

Where desired, I may add plasticizer to my binder. The plasticizer may be any commercially available substance of this class providing it does not decrease appreciably the permeability of the backing coating to the applied adhesive, or the vehicle thereof.

I compound my binder with filler materials. These are preferably inert, although fillers which have a colloidal character, and form or assist in forming water dispersions may be used in whole or in part as desired. Otherwise, I have an unrestricted choice of fillers, preferring those which are inexpensive. Fibrous fillers may be employed if desired, but I do not regard them as advantageous because they tend to interfere with the smooth application of my coating to the felt base. Of the available inexpensive mineral fillers, I have found slate flour entirely satisfactory.

Pigments may be added to the composition as may be thought desirable for appearance.

My compositions, prior to application to the felt base material, have incorporated into them both an organic solvent of such nature as partially to extract the binder of the felt base material or the binder of any coating applied thereto, and water.

The proportions of binder and filler are such as to give a composition which, when dried, is well unified by the binder and is strong, but which at the same time is porous or at least permeable to solvents. It is a composition which is not repellent either to water or to organic solvents, being readily wet and permeated by both.

As an example of a formula which may be compounded in any suitable mixing vessel, I give the following, it being understood that the proportions as well as the ingredients are capable of variation in the light of my teachings above:

| | Per cent |
|---|---|
| Water | 28.2 |
| Dry rosin size | 10.5 |
| China clay | 17.5 |
| Slate flour | 35.0 |
| Naphtha | 8.8 |

In the above table the dry rosin size is substantially one-sixth of the dry weight of the composition.

The percentages are by weight. The mixing should be continued until a homogenous composition is obtained in which the ingredients are thoroughly mixed. The proportions given provide a composition of paint-like consistency which may be applied to felt base material by means of a doctor blade, roller, print block, brush, or spray. It may be applied to the felt base when both are cold, or the felt base may be coated so soon after saturation with the asphalt as to retain some residual heat.

When my composition is applied, the organic solvent attacks the bitumen in the felt base and causes it in part to permeate the coating and to amalgamate or blend with the free rosin therein. The blending of the bitumen with my coating renders the coating more flexible. The water in my composition serves not only to control its consistency in large part and to facilitate its application to the felt base, but also prevents the formation of any condition in the coating such that after drying it is impermeable to the water vehicle of water type glues. It also softens the saponified material, unifying it, and causing it to act as a strong binder in the dried composition.

My coating composition should be applied relatively thinly, but thick enough to insure satisfactory coverage. I have, for example, secured excellent results with the composition above applied so as to leave on the felt base about .35 pounds of the dried substance per square yard. A coating as heavy as .62 pound per square yard begins to show a lack of flexibility in that, if the felt base material is bent reversely around a short radius, unsightly cracks may form in the coating. Its utility and functioning is not, however, otherwise impaired.

As indicated above, I may also make compositions in which the partial saponification occurs during the process of manufacture. An example of the ingredients of such a composition is:

| | Per cent |
|---|---|
| Water | 27.1 |
| Soda ash | 0.6 |
| Caustic soda | 0.5 |
| Rosin | 2.2 |
| Crude tall oil | 5.0 |
| China clay | 16.7 |
| Slate flour | 41.8 |
| Naphtha | 6.1 |

In the above table the soda ash, caustic soda, rosin, and crude tall oil constitute substantially one-eighth of the dry weight of the composition.

Again, the percentages and materials may be varied. In making such a composition, I place the water, soda ash and caustic in a steam-jacketed mixer and while applying heat, I add the rosin and/or the tall oil and/or other resinous or fatty acids in the proper amount to produce saponification to the desired degree. I continue to stir and heat the mixture until the reaction has proceeded to the desired length, whereupon I add the filler, with or without pigments, and incorporate them. The naphtha or other volatile solvent is preferably added last and under conditions to lose as little as possible of it by evaporation.

Under the term "rosins," I include both the so-called wood rosins and the so-called gum rosins. As an example of a resinous material I may use, I call attention to the commercially available Newport Pembro-B resin.

In the light of my teachings, results may be obtained by employing compositions comprising water and an organic solvent, a filler in proper quantity, a water-insoluble binder miscible with asphalt, and a water soluble binder miscible with the constituents of water glues, together with a material or materials capable of keeping these diverse substances in association. It is also possible to secure results by employing along with the filler a water-insoluble binder, attackable by organic solvents and miscible with asphalt, and a colloidal material, a dispersing agent or a wetting agent in proper amount to make the dried composition readily wetted by water, and to keep the ingredients in suspension in the water and organic solvent. If the waterproof binder is proportioned to the filler so as to provide a porous coating which is readily water permeable by reason of the colloidal, dispersing or wetting agent, the use of a water soluble binder constituent may be omitted. Best results in my experience are obtained, however, by having present both a water-soluble and a water-insoluble ingredient both of which are strong binders.

In place of the naphtha, or along with it, I may employ other organic solvents, depending upon the nature of bond to be produced. Naphtha is an inexpensive and available solvent, and is very satisfactory when my coating composition is applied directly to felt base saturated with asphalt or other bitumens. I have also found that the exemplary compositions given above work very well when applied to felt base previously coated with the usual backing layer, such as a backing composition comprising rosin, the ammonia salt of casein, and waxes and oils. In the case of other back coatings more difficultly attackable by naphtha, any appropriate organic solvent may be substituted, my compositions being ones with which organic solvents are readily miscible. I have even found it possible to apply my coating to felt base materials previously coated with paints and the like containing polymerized drying oils, using in this instance as the organic solvent a mixture of alcohol and acetone capable of attacking the paint vehicle.

It is not necessary that my compositions be applied as solid coatings for felt base materials. In the contrary, I have found interspaced areas of my coating, providing the aggregate area is large, serve very well. I may thus produce a felt base product having a first over-all backing coat of the usual character, such as that discussed above and in one color, and I may then apply my composition in a contrasting color and in interspaced areas to the backing coat by means of a printing roller. Again I may apply my composition in two or more coats of the same or of contrasting colors, as may be desired. I may first form an over-all coating of my composition by knifing, spraying, or roller coating, and then impose upon it a discontinuous over-coat of my composition, differently colored and in an attractive design, such for example as a basket weave design.

My compositions do not form in themselves adhesives which can serve to adhere felt base materials to supporting surfaces. They are rather designed to serve as an intermediary between the felt base and applied adhesive, forming an exceptionally strong bond with both, whether the applied adhesive be of the water or waterproof type. Thus my coating serves to enable me to produce a product which can be adhered to a supporting surface by means of any of the available glues or cements without the blistering difficulty and lack of adhesion heretofore encountered. My coatings are relatively thin and, while they are porous in the sense of being permeable to and forming strong bonds with applied adhesive, they are not so porous as to render the applied product likely to lose its adhesive union through washing or wetting. The layer of my composition is not more attackable by water than the adhesive used to fasten the felt base in place. Needless to say, where an applied felt base material is to be frequently or continuously subjected to water or moisture, as in a shower room, a waterproof type cement should be used as the adhesive. I have found, however, that where such cements are used, a satisfactory water and moisture resistant result is obtained, and there is no tendency for my compositions, after permeation as set forth, to be affected by water or moisture.

It will be seen that through the use of my composition, I am enabled to provide felt base materials of attractive appearance, and non-adhesive as stored, handled or shipped, which are capable of general use and can be adhered to surfaces by means of any type of cement. Since my compositions can be applied cold to the felt base material, it is evident that they can, if desired, be applied on the job, providing a satisfactory drying time is given the coated product before the application of adhesive. It is an advantage of my compositions, however, that they may be applied in the factory and during the formation of felt base goods, and that they do not interfere either with the usual operations or with handling operations. Materials made in accordance with my process do not tend to stick or offset in the roll after having been properly dried.

My materials may be employed for cementing to floors of wood, concrete or other materials, to walls of plaster, plasterboard, wallboard, plywood, or other base, and to articles of furniture and the like. The decorative surfacing may be one appropriate to the particular use; or where employed as wall coverings, my materials may be made without decorative facings, being coated on the face side only with a ground or base coat for the reception of paint or enamel, which may be applied after the adhesive union of the felt base to the wall, and may be renewed as circumstances warrant. My materials are thus especially advantageous for adhesion to prepared panels or walls of prefabricated dwellings. The felt base products may if desired be treated for flame-proofing and mildew proofing.

Modifications may be made in my invention without departing from the spirit of it. Having thus described my invention in certain exemplary embodiments, what I claim as new and desire to secure by Letters Patent is:

1. A felt base material prepared for adhesive union with a support and comprising a fibrous sheet saturated with bitumen and bearing upon one surface a coating comprising binder components one of which is water insoluble, miscible with said bitumen and firmly bonded to the bitumen saturant in said base, and the other of which is water soluble, the total weight of said binder components being substantially between one-sixth and one-eighth of the dry weight of said coating, the first mentioned binder component being substantially one-fifth of the total weight of said binder components and said second mentioned binder component being substantially four-fifths of the total weight of said binder components whereby the water permeable character of said coating is preserved, said coating also containing an inert filler to increase its porosity, said first mentioned binder component being a material chosen from the group consisting of rosin and tall oil and said second mentioned binder component being a water soluble soap of a material of said group.

2. The structure claimed in claim 1 in which said binder components are respectively the unsaponified and saponified portions of rosin size.

3. The structure claimed in claim 2 wherein said coating is discontinuous in part at least and exists in closely spaced areas on said felt base material.

4. The structure claimed in claim 2 wherein said coating contains a pigment and is applied as a decorative coating.

5. The structure claimed in claim 2 wherein said coating contains a wetting agent.

6. A felt base material prepared for adhesive union with a support and comprising a fibrous sheet saturated with bitumen and bearing upon one surface a coating comprising binder components one of which is water insoluble, miscible with said bitumen and firmly bonded to the bitumen saturant in said base, and the other of which is water soluble, the total weight of said binder components being substantially between one-sixth and one-eighth of the dry weight of said coating, the first mentioned binder component being substantially one-fifth of the total weight of said binder components and said second mentioned binder component being substantially four-fifths of the total weight of said binder components whereby the water permeable character of said coating is preserved, said coating also containing an inert filler to increase its porosity, said first mentioned binder component being a material chosen from a group consisting of rosin and tall oil capable of forming water soluble soaps upon saponification, and said second mentioned binder component being a water soluble soap thereof, said binder components acting together to form a strong coating permeable to the solvents of and capable of bonding with both water soluble and water insoluble adhesives.

7. A composition for application to bitumen-saturated felt base materials and being an oil-in-water dispersion consisting of binder components one of which is water insoluble and miscible with the bitumen saturant of felt base materials and the other of which is water soluble, said first mentioned binder component being a member chosen from a group consisting of rosin and tall oil capable of forming water soluble soaps upon saponification, and said second mentioned binder component being a water soluble soap thereof, said composition containing an inert filler, the total weight of said binder components being substantially between one-sixth and one-eighth of the dry weight of the solids in said coating composition, the first mentioned binder component being substantially one-fifth of the total weight of said binder components and the said second mentioned binder component being substantially four-fifths of the total weight of said binder components, and said composition containing also water and an organic solvent for said first mentioned binder component and for said bitument saturant, the quantity of water being greater than the quantity of said organic solvent.

8. The composition claimed in claim 7 in which said binder components are respectively the unsaponified and saponified portions of rosin size.

9. A composition of matter for the purpose described containing the following materials in substantially the proportions set forth:

| | Per cent |
|---|---|
| Water | 28.2 |
| Dry rosin size | 10.5 |
| China clay | 17.5 |
| Slate flour | 35.0 |
| Naphtha | 8.8 | and in which substantially one-fifth of said dry rosin size is free rosin.

RALPH F. SEEDORF.

REFERENCES CITED

The following references are of record in the file of this patent:

UNITED STATES PATENTS

| Number | Name | Date |
|---|---|---|
| 1,524,090 | Finley | Jan. 27, 1925 |
| 1,610,959 | Lines | Dec. 14, 1926 |
| 1,672,377 | Exley | June 5, 1928 |
| 2,294,727 | Dreshfield | Sept. 1, 1942 |